[11] 3,597,962

| | | | |
|---|---|---|---|
| [72] | Inventor | Leslie C. H(... W. Hyattsville, Md. | |
| [21] | Appl. No. | 779,002 | |
| [22] | Filed | Nov. 26, 1968 | |
| [45] | Patented | Aug. 10, 1971 | |
| [73] | Assignee | The United States of America as represented by the Secretary of the Navy | |

[54] TRAVELING-TRANSDUCER METHOD OF MEASURING CROSS CORRELATION
9 Claims, 4 Drawing Figs.

[52] U.S. Cl. ............................................. 73/71.4
[51] Int. Cl. ............................................. G01h 1/00
[50] Field of Search ........................................... 73/67—70, 71.4, 71.5; 310/8.3, 8.4, 8.5, 9.1

[56] References Cited
UNITED STATES PATENTS

| | | | |
|---|---|---|---|
| 2,837,914 | 6/1958 | Caldwell | 73/67.1 |
| 2,645,938 | 7/1953 | Dinstein | 73/67.8 X |
| 3,015,949 | 1/1962 | Arnold | 73/71.5 |
| 3,022,660 | 2/1962 | Klatchko | 73/67.8 |
| 3,222,919 | 12/1965 | Shoor | 73/67.1 |
| 3,411,344 | 11/1968 | Lloyd | 73/67.2 |
| 3,422,668 | 1/1969 | Reutlinger | 73/71.4 |

Primary Examiner—Richard C. Queisser
Assistant Examiner—C. E. Snee, III
Attorneys—L. A. Miller, Q. E. Hodges and A. Sopp ABSTRACT: An arrangement for investigating the behavior of vibration in structures in a continuous manner rather than at discrete points. A plurality of reference and traveling transducers are positioned magnetically on a body which is subjected to vibration. As each traveling transducer is moved continuously, its output is correlated with that of the reference transducer and the resulting correlation function plotted, displayed, or recorded. The readouts of several transducers may be correlated with one or more appropriate reference transducers and recorded on a precision multichannel recorder.

Patented Aug. 10, 1971

INVENTOR
LESLIE C. HOLTZ

BY

ATTORNEYS

Patented Aug. 10, 1971

INVENTOR
LESLIE C. HOLTZ

Albert Hopp
J. P. Hodges
BY
ATTORNEYS

TRAVELING-TRANSDUCER METHOD OF MEASURING CROSS CORRELATION

The invention described herein may be manufactured and used by or for the Government of the United States of America for governmental purposes without the payment of any royalties thereon or therefor.

BACKGROUND

Heretofore measurement and analysis of vibrations in structures have been limited to sensing at discrete times the vibrational frequencies and amplitudes existing at stationary points on the surface of the structure. Functions of vibratory response, such as correlation functions, have been made as a function of fixed or variable time delays which are fed into the measurement instrumentation. Any interpretation of the measurement data must be referred to the particular fixed measurement points. A series of fixed points has been used to represent sound (or vibrations) behavior over a path, but such procedure is tedious and requires accurate remounting of transducers for producing repeatable, meaningful data. Time delay units, which may be used to extrapolate points on the path, have very short maximum time delay if made frequency independent. The longer the maximum time delay, the more error due to frequency dependency.

SUMMARY

In the arrangement of the present invention, a structural body subjected to vibrations is provided with relatively movable acoustic transducers, one or more of which may serve as reference transducers and "traveling" transducers respectively. The transducers may be attached to the body magnetically. The outputs of the transducers are fed via separate channels in which filtering and amplification are balanced, to a correlator. The output of the correlator is fed to an appropriate continuously moving recorder or display means which is synchronized with the continuous movement of the traveling transducer. During the measurement cycle the traveling transducer is continuously moving in a predetermined path on the surface of the body. Thus for each path of the body traversed for measurement purposes there is produced a spatial correlation function between the reference and traveling transducers. By analyzing the measurement data provided by the present arrangement, a frequency amplitude "map" of vibrations in the body under test may be made. By interposing time delay between the reference and traveling transducer readout channels, an indication of the direction of vibration waves may be obtained.

Accordingly, the objects of the invention are to provide: an improved, simplified transducer arrangement for measuring the characteristics of vibrations in structural bodies; an arrangement for providing measurement of vibrations in structural bodies in a continuous manner so as to provide as continuous output spatial correlation functions between one or more reference and other transducers moving relative thereto; a transducer-measuring arrangement for providing in predetermined paths smooth and continuous movement of transducers over the surface of bodies for which it is desired to determine the characteristics of vibrations therein.

Other objects, features and advantages of the present invention will be better understood by reference to the following detailed description and accompanying drawings in which like reference numerals relate to like parts and in which.

Figure 1:
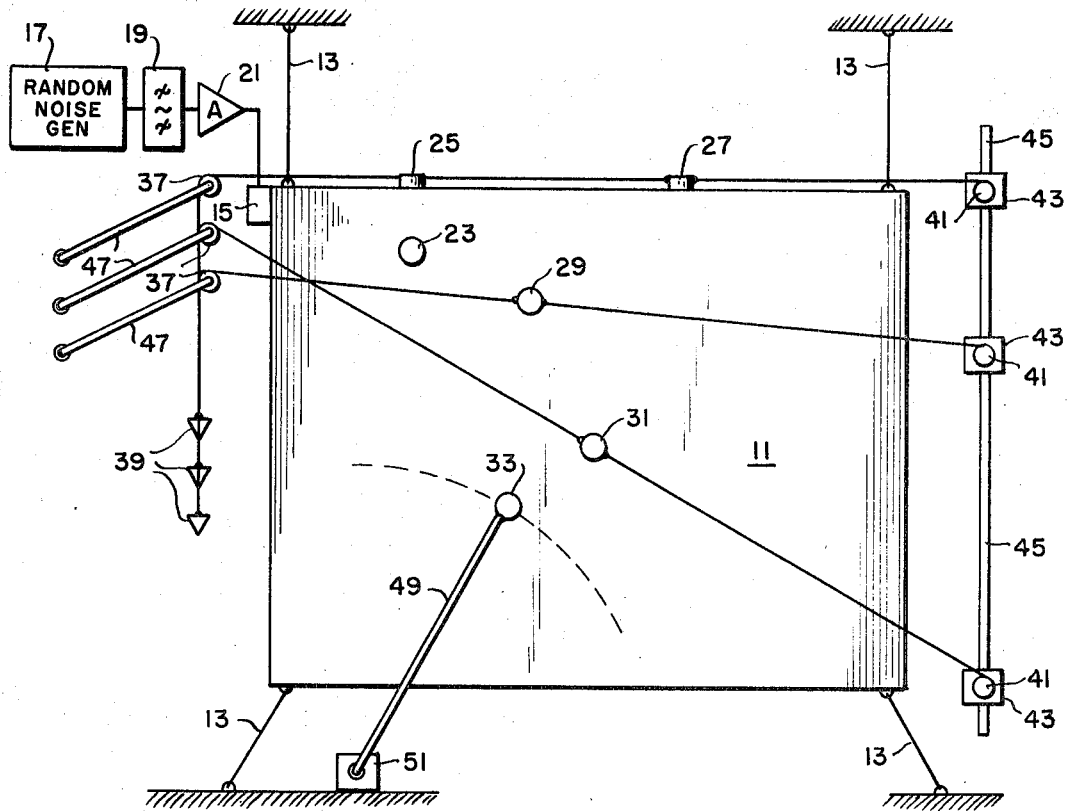
FIG. 1 is a side view of one embodiment of a vibration measuring transducer arrangement according to the invention.

Referring to FIG. 1, there is shown a test specimen in the form of a structural body such as a panel 11 which for vibration measurement purposes may be isolated from ambient vibrations occurring in environmental structure by means of flexible suspensions and supports 13. Attached to the panel 11 at a desired location, such as at one corner, is an acoustic transducer 15 for enforcing vibrations on the panel. Any suitable number of vibration generating transducers or other vibration sources may be located at appropriate positions on the panel, or at positions remote from the panel.

Any suitable input waves may be fed to the vibration generating transducer 15. As shown in FIG. 1, input waves are derived from a random noise generator 17 whose output is passed thru a variable band pass filter 19 and via an amplifier 21 to the transducer 15.

Figure 2:
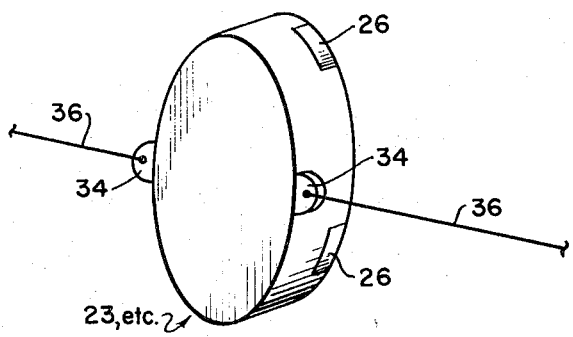
FIG. 2 is a view in perspective of one of the transducers employed in the vibration measuring arrangement of the invention.

One or more reference transducers 23 and 25 are shown mounted on the panel 11. In the case where the panel 11 is magnetic material, the transducers 23 and 25 may, as shown in FIG. 2, be provided with small magnets 26 to hold them in place on the panel. If the panel is of nonmagnetic material or is of rough surface characteristics, a thin strip or sheet of magnetic material having a smooth surface may be bonded to the panel at those locations at which transducers are to be positioned or moved.

A plurality of traveling transducers 27, 29, 31, 33 is also positioned on the panel for movement relative to fixed transducers 23, 25. The transducers 27, 29, 31, 33 are each provided with small magnets 26, as shown in FIG. 2, for holding the transducers in contact with the surface. The strength of the magnets 26 should be such that the transducers are easily movable along the panel surface. A lubricant may be used on the bottom surfaces of the transducers to facilitate their easy movement. The traveling and reference transducers may each comprise a subminiature piezoelectric accelerometer which is cemented to magnets in its bottom so as to provide a smooth surface for intimate contact with the surface of the test specimen.

As shown in FIG. 2, each of the transducers 27, 39, 31 has a pair of small eyelets opposingly mounted thereon for attachment to lightweight small diameter wire, cord, thread, filament 36. As shown in FIG. 1, the wire on one side of the transducer is wound around one of a plurality of free-running pulleys 37 and terminates in a weight 39. The wire on the other side of the transducer is wound around one of a plurality of drums 41 driven by motors 43. Thus, means are provided for moving said transducers in contact with and along the surface of the panel in a path determined by the location of the pulleys 37 and drums 41. Motors 43 may be movable in tracks 45 mounted in any suitable manner in situ, and the pulleys 37 may be mounted on movable arms 47, so that the paths of the transducers may be varied.

The transducer 33 is shown mounted at the end of a rotating arm 49 driven by a motor 51. Thus, means are provided for moving the transducers in circular paths on the surface of the panel. Obviously, other paths of transducer travel may be produced by suitable driving means of more elaborate construction.

Figure 3:
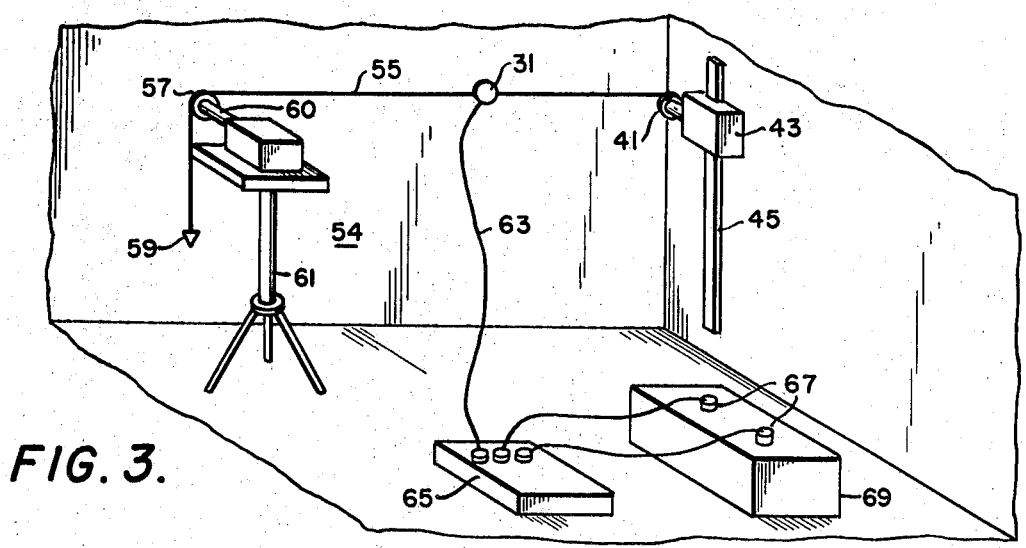
FIG. 3 is a view in perspective of another embodiment of the invention showing a transducer arrangement for measuring vibrations in a nonlaboratory environment.
Figure 4:
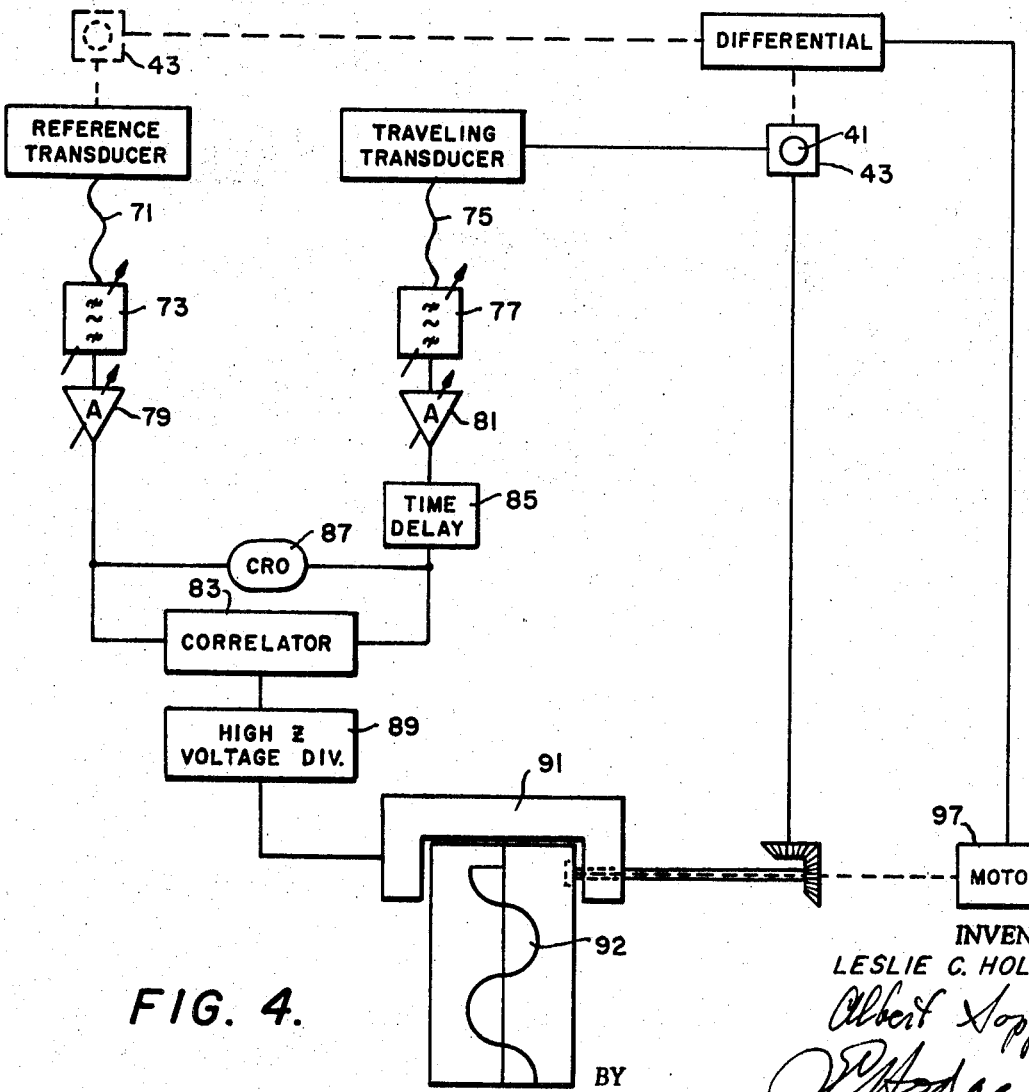
FIG. 4 is a view in schematic form of the electrical and mechanical interconnections of the vibration measuring transducer arrangement of the invention.

The measurement arrangement of FIG. 3 depicts vibration measurement in a panel not isolated from other structure— say, a panel 54 forming the wall or wall portion of a room, hull, watertight compartment, fuselage, etc. A traveling transducer 31 is connected on one of its sides by a thin, lightweight wire or filament 55 passing over a pulley 57 to a weight 59, and on the other side to a drum 41 driven by a motor 43 mounted for movement along track 45. The pulley 57 is mounted on a free running shaft 60, and the shaft is mounted in any suitable manner on a vertically adjustable platform 61 so that the path of the transducer 31 may be varied. A pair of leads 63 feeds the output of the transducer to an input terminal of an electronic unit 65 later to be described in conjunction with FIG. 4.

Inputs to the other terminals of the unit 65 are derived from one or more transducers 67 which are mounted on machinery generally indicated by the box 69. The machinery 69 may be located near or remote from the panel 54 and may be, for example, auxiliary machinery aboard ship. The FIG. 3 arrangement can thus be seen to provide a measurement of vibrations in the panel 54 in relation to vibration sources located nearby or remotely.

The readout electronics for indicating the vibration measurements employs two channels—a "reference" channel and a "traveling" channel, and means for synchronizing the relative movement between reference and traveling transducers so that a correlation function between the reference and traveling transducer outputs may be displayed or plotted in relation to their spatial orientation. In particular, the output of one or more reference transducers (which transducers may be stationary or moving) is fed via its lead 71 in the reference channel to a variable band-pass filter 73 of any suitable well-known design. The output of one or more traveling transducers is fed via its lead 75 to a variable band-pass filter 77 of identical design to filter 73 in the traveling channel. Respective identical adjustable amplifiers 79 and 81 are provided in the reference and traveling channels for feeding the filtered and amplified transducer outputs to a correlator 83 of any suitable well known design. An example of a suitable phase angle correlator is AD-YU precision phase meter, model 405-L, which resolves the inputs received from each transducer into a scaled output relative to the cosine of the difference in phase angle between the reference input and a traveling transducer input. A variable time delay device 85 of any suitable conventional design is connected in one of the two channels, and a suitable indicator such as a cathode ray oscilloscope 87 is similarly connected to monitor the balance, time delay and frequency response of the channels. An example of a suitable time delay device is the EPSCO time delay line which is capable of a delay from zero to 5 milliseconds in 125 discrete steps of 40 microseconds per step.

The correlated channel outputs are fed from the correlator 83 to a high impedance voltage divider 89 to thus provide suitable input levels for driving the stylus of a recorder 91 which produces the exemplary analog correlation function 92 on the recorder drum.

In the case where the reference transducer is stationary, synchronization between the traveling transducer and the recorder may be carried out by simple gearing 93 connecting the motor 43 to the recorder. If the reference transducer is connected to move in the manner previously described for the traveling transducers so that it has a driving motor 43, the output of its motor and that of the traveling transducer may be electrically or mechanically fed to an electrical or mechanical differential unit 95 of any suitable well-known design. The output of the differential may then directly drive the recorder 91 or may control driving motor 97 to thus drive the recorder.

OPERATION

For correlation calibration, the traveling transducer is positioned as close as possible to the reference transducer so that each responds to essentially the same vibratory motion in the panel. The outputs of the two transducers are fed to their respective channels so that an output equivalent to autocorrelation is very nearly obtained, especially if the transducers are very small in relation to the period of vibration. Alternatively, autocorrelation may be used by sending a signal from one of the transducers into both channels.

In all of the above calibration procedures, a correlation coefficient very close to unity may be obtained. The reference and traveling channels should be matched by adjustment of the elements 73, 77, 79 and 81 in accordance with indications on the CRO 87.

In carrying out the measurements, when vibrations are enforced on the test specimen, the traveling transducer is moved in relation to the reference transducer, and the correlation function, proportional to the phase angle, plotted on the recorder 91. If desired, any suitable apparatus of well-known design can be employed to convert the correlation function or phase angle to a cosine function thereof, thereby producing the correlation coefficient.

The measurement procedure of the invention provides a graphic recording of the spatial correlation function of one response signal (transducer output) relative to another throughout a continuous path, the path distance corresponding to the abscissa of the graph.

Time delay techniques are not needed in this procedure for interpolating between measurement points. Also, the present arrangement is frequency independent and may therefore by used to observe correlation functions and other signal functions of interest in a broad frequency band as well as in selected frequency bands throughout the path of travel.

In the case where the body being measured is elongated, such as a beam or the like, or is in some other configuration which exhibits primary bending, the bending wavelength and the resultant propagation velocity of the complex wave can be determined directly from the graphic recording of the correlation function. The transducer's path may be in the direction of the bending wave propagation, thus providing directivity for the cross correlation measurement.

If the correlation coefficient is found to be relatively constant and substantial over a significant portion of the traveled path, it would indicate that the bending wave propagation is perpendicular to the path of the traveling transducer in that region.

Also, the direction of the vibrations in the transducer path on the body may be determined by use of the time delay device 85. It is noted that the cross correlation function will be a maximum when the spatial separation between two transducers is such that the difference in arrival times at the velocity of the vibrations moving in the body is equal to the delay time when inserted into the channel of the earlier signal. Therefore, by inserting a time delay of duration of the period of the center frequency of vibration between the transducers, and by moving one of the transducers around the other, a direction will be found in which the cross correlation is a maximum and will thus indicate the direction of propagation of vibrations at that given center frequency.

It is understood that the invention is not limited to the specific apparatus shown and described. For example, any suitable transducers or accelerometers having vibration response characteristics may be employed. The transducers may be positioned on the specimen being tested by gravity. The transducers may be moved manually or by any suitable lightweight apparatus such as rigid movable arms made of light wood or metal. Obviously, the more massive the supports and more direct their coupling to the transducers, the less accurate the readout. The driving apparatus for moving the transducers may be manual or any suitable motive power means. The outputs of the transducers may be read on a meter and recorded, or directly recorded, for later data processing and analysis. Correlation may be carried out in any suitable manner including manual calculation.

It is to be understood that the invention is not limited to the exact detail of the construction shown and described for obvious modifications will occur to persons skilled in the art.

What I claim is:

1. Apparatus for investigating the behavior of vibrations in a body comprising:
   reference transducer means;
   traveling transducer means;
   means for movably attaching both said transducer means to the surface of the body for continuous movement thereon relative to each other;
   output channel means for each transducer; and
   correlation means connected to said output channel means for producing an output correlation function of the vibration responses of both said transducer means when continuously moved relative to each other.

2. Apparatus according to claim 1 further comprising vibration-transmitting means located on the body for imparting vibrations of predetermined characteristics to the body.

3. Apparatus according to claim 1 further comprising means for isolating the body from unwanted ambient vibrations.

4. Apparatus according to claim 1 wherein said means for movably attaching comprises magnetic elements located on the transducers for holding the transducers in intimate contact with portions of the body which are comprised of magnetic material.

5. Apparatus according to claim 3 or 4 or 5 or 6 wherein said means for movably attaching further comprises motive power means and linkage elements coupling said motive power means to at least one of said transducer means, and wherein said apparatus further comprises:
output recording means coupled to said correlation means; and
means for synchronizing said output recording means and said motive power means in correspondence to the relative movement between both said transducer means.

6. The method of investigating the behavior of vibrations in the body comprising the steps of:
subjecting the body to vibrations;
measuring the vibrations with a transducer stationed at a point on the body;
moving a second transducer relative to the first transducer and sensing the vibrations;
correlating the outputs of the first and second transducer with respect to the difference in phase angle therebetween; and
recording the correlated output.

7. The method of claim 6 wherein the recording medium of the recorder is moved in synchronism with the movement of the traveling transducer producing a display of the spatial relationship between the movable transducer and the stationary transducer.

8. Apparatus according to claim 1 wherein the correlation means produces an output which is a function of the difference in phase angle between the signals from each transducer.

9. The method of claim 6 wherein said second transducer is moved around said first transducer in a substantially circular path;
delaying the output of said second transducer an amount in time corresponding to the period of the frequency of vibrations; and
determining the point in said substantially circular path in which the cross correlation between the outputs of the first and second transducers is a maximum, indicating the direction of propagation of the vibrations.